(12) United States Patent
Nagayama et al.

(10) Patent No.: US 8,536,744 B2
(45) Date of Patent: Sep. 17, 2013

(54) TRACTION MOTOR

(75) Inventors: Takashi Nagayama, Kanagawa-ken (JP); Shigetomo Shiraishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 13/229,450

(22) Filed: Sep. 9, 2011

(65) Prior Publication Data

US 2012/0062057 A1    Mar. 15, 2012

Related U.S. Application Data

(63) Continuation of application No. PCT/JP2010/001679, filed on Mar. 10, 2010.

(30) Foreign Application Priority Data

Mar. 17, 2009    (JP) ................ P2009-065063

(51) Int. Cl.
*H02K 9/06*    (2006.01)

(52) U.S. Cl.
USPC .................. 310/59; 310/58; 310/91

(58) Field of Classification Search
USPC .......... 310/59, 91, 89, 52, 58, 62, 64
See application file for complete search history.

(56) References Cited

U.S. PATENT DOCUMENTS

| 2,887,593 | A  | * | 5/1959 | Wiedemann ............. 310/58 |
| 6,522,036 | B1 | * | 2/2003 | Chen ..................... 310/58 |
| 6,891,290 | B2 | * | 5/2005 | Nagayama et al. ........ 310/58 |
| 7,642,680 | B2 | * | 1/2010 | Nagayama et al. ........ 310/58 |
| 2006/0226717 | A1 | * | 10/2006 | Nagayama et al. ........ 310/58 |
| 2006/0261687 | A1 | * | 11/2006 | Nagayama et al. ........ 310/58 |
| 2008/0036314 | A1 | * | 2/2008 | Kanei et al. ............ 310/59 |

FOREIGN PATENT DOCUMENTS

| CN | 1503433 A | 6/2004 |
| CN | 1848620 A | 10/2006 |
| CN | 1862921 A | 11/2006 |
| JP | 2004-194498 | 7/2004 |
| JP | 2006-271081 | 10/2006 |
| JP | 2006-314183 | 11/2006 |
| JP | 2008-295286 | 12/2008 |

OTHER PUBLICATIONS

International Search Report issued Jun. 1, 2010, in PCT/JP2010/001679 (with English-language translation).

(Continued)

*Primary Examiner* — Tran Nguyen
*Assistant Examiner* — Naishadh Desai
(74) *Attorney, Agent, or Firm* — Oblon, Spivak, McClelland, Maier & Neustadt, L.L.P.

(57) ABSTRACT

According to one embodiment, a traction motor includes a stator core, a rotor core, a first bearing, a second bearing, a rotor shaft, a first ventilation passage made at an outer circumference portion of the stator core, a first fan, and a second ventilation passage to introduce external air. And, in the motor, a first minute gap is provided between an end portion of a first fan main plate and an inner circumference portion of the first bracket, cooling wind is discharged to the motor outside via the second ventilation passage, an outer circumference portion of the first fan, a ventilation portion in the first bracket and the first ventilation passage, and the second ventilation passage is made so that the cooling wind entered from the first air intake port flows around the rotor shaft portion between the first ventilation fan and the first bearing.

10 Claims, 11 Drawing Sheets

(56) References Cited

OTHER PUBLICATIONS

Japanese Office Action Issued Dec. 7, 2012 in Patent Application No. 2009-065063 (with English translation).

Combined Office Action and Search Report issued Jan. 10, 2013 in Chinese Application No. 201080012244.1 (With English Translation).

* cited by examiner

TRACTION MOTOR

CROSS-REFERENCE TO RELATED APPLICATION

This application is a Continuation and is based on PCT International Application No. PCT/JP2010/001679, filed Mar. 10, 2010, which is also based upon and claims the benefit of priority from the prior Japanese Patent Application No. 2009-065063, filed on Mar. 17, 2009, the entire contents of which are incorporated herein by reference.

FIELD

Embodiments described herein relate generally to a traction motor.

BACKGROUND

Figure 14:
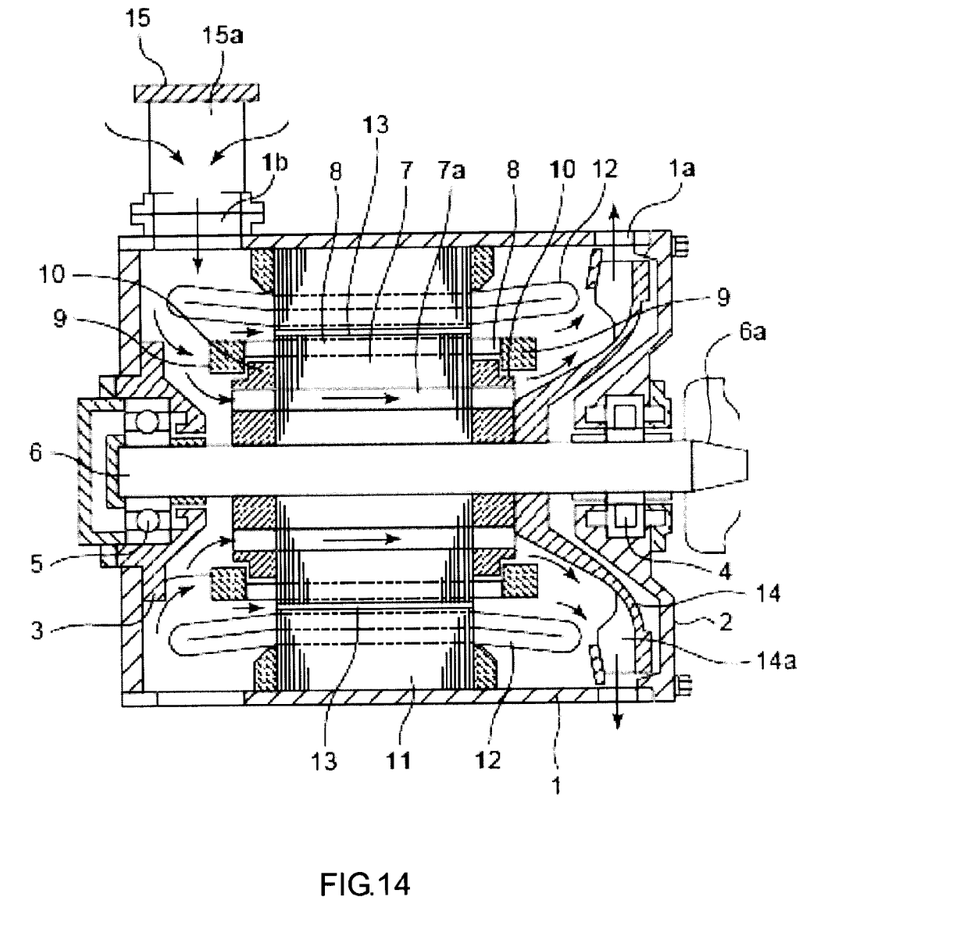
FIG. 14 is a sectional view of a conventional open type traction motor.

In a typical rail vehicle (hereinafter, called a "vehicle"), a traction motor (hereinafter called a "motor") is mounted on a bogie arranged below the vehicle body, and the rotative force of this motor is transmitted to the vehicle wheels through a coupling and a gearwheel device to move the vehicle. The construction of a conventional motor of this type is as shown in FIG. 14. The conventional motor shown in FIG. 14 has a cylindrical frame 1 constituting a fixed member, and a bearing bracket 2 is mounted on one end side of this frame 1, a housing 3 is mounted on the central portion of the other end side of the frame 1, and bearings 4, respectively provided at the central portions of the bearing bracket 2 and the housing 3 rotatably support both end portions of a rotor shaft 6. A rotor core 7 is fixed on the central portion in the axial direction of the rotor shaft 6, rotor bars 8 are embedded in a large number of respective grooves formed at the outer circumference side of the rotor core 7, the both end portions of the rotor bars 8 project from the rotor core 7, and these projecting potions are integrally connected by ring-shaped end rings 9, 9, respectively, to thereby form a cage rotor of an induction motor. The rotor core 7 is provided with a plurality of ventilation passages 7a passing therethrough in the axial direction, and the rotor core 7 is fixed by means of core holders 10, 10 having the similar ventilation passages.

A cylindrical stator core 11 is mounted on the inner circumference portion of the frame 1, and stator coils 12 are accommodated in a large number of respective grooves formed at the inner circumference side of this stator core 11. The coil end portions of these stator coils 12 are projecting from both sides of the stator core 11.

An air gap 13 is formed between the inner circumference surface of the stator core 11 and the outer circumference surface of the rotor core 7. A drive shaft portion 6a of the rotor shaft 6 projects outside the motor. A coupling for coupling with a drive gearwheel device is mounted on this projecting portion of the drive shaft portion 6a. A ventilation fan 14 is mounted on a portion of the rotor shaft 6 within the motor. The ventilation fan 14 has a plurality of vanes 14a arranged radially from the center of its axis of rotation. A plurality of exhaust ports la are provided along the circumferential direction at portions in this frame 1 facing the outer circumference portion of this ventilation fan 14. An air intake port 1b is provided above the side opposite to the drive side of the frame 1, a ventilation filter 15 is mounted so as to cover this air intake port 1b, and a filter 15a for capturing dust is mounted on the external air intake portion of this ventilation filter 15.

Mounting arms (not shown) provided on the frame 1 of the entire motor shown in FIG. 14 are fixed by means of bolts to the bogie frame, and the rotative force of the motor is transmitted from the drive device to the vehicle wheels through a coupling connected to the drive shaft 6a portion of the rotor shaft, to thereby move the vehicle.

When this motor is operated, as heat is generated by the stator coils 12 and the rotor bars 8, cooling is performed by passing external air through the interior of the motor. Rise in temperature of the motor is suppressed by this cooling. This cooling action is as follows.

During the operation, the ventilation fan 14 is rotated together with the rotor shaft 6, causing the air within the motor to be discharged outside the motor from the exhaust ports 1a, and thereby external air is sucked into the motor from the air intake port 1b. The external air flows into the motor from the air intake port 1b through the ventilation filter 15, and then flows to the ventilation fan side through the ventilation passages 7a of the rotor core and the air gap 13 between the outer circumference of the rotor core 7 and the inner circumference of the stator core 11, and is discharged outside the motor from the exhaust ports 1a by rotation of the ventilation fan 14.

External air is circulated in the motor in this way, and thereby the rotor bars 8, the stator coils 12, the bearings 104, 105 and the grease to lubricate these are cooled so that the rise in temperature thereof does not exceed the allowable temperature.

Large quantities of dust entrained during vehicle running are present in the external air around a motor that is mounted on an under floor bogie of an electric car or the like, and the external air which is taken in is under a severely polluted environment. Consequently, in the motor according to the conventional example shown in FIG. 14, although an attempt was made to clean the external air taken into the motor by capturing dust with the filter 15a of the ventilation filter 15, but as the gradual blockage of the filter 15a took place with the continuous operation and the amount of ventilation within the motor decreased, the periodic cleaning/maintenance of the filter was therefore required at short intervals. In addition, there was a technical problem that the dust which had passed through the filter 15a attached to and piled up in the motor and thereby the expenditure of a very considerable amount of labor was required for cleaning it.

In order to solve this problem, in recent years, the development of fully enclosed motors with outer fans has been promoted.

Figure 10:
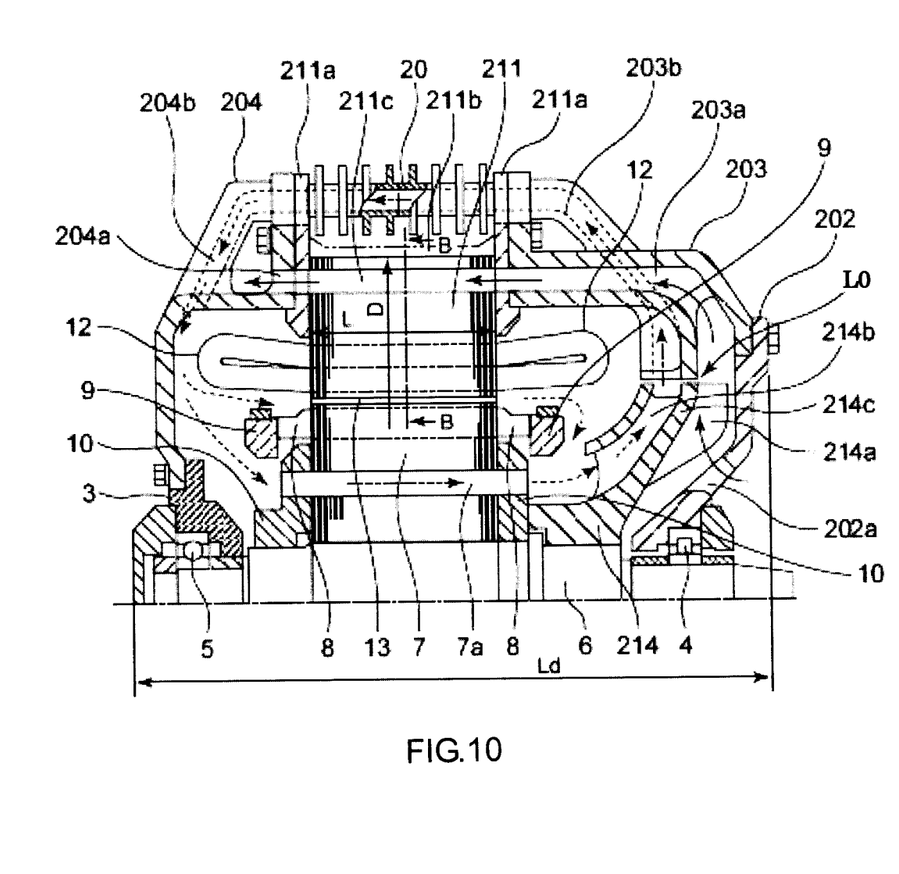
FIG. 10 is a sectional view of a conventional fully enclosed type motor.
Figure 11:
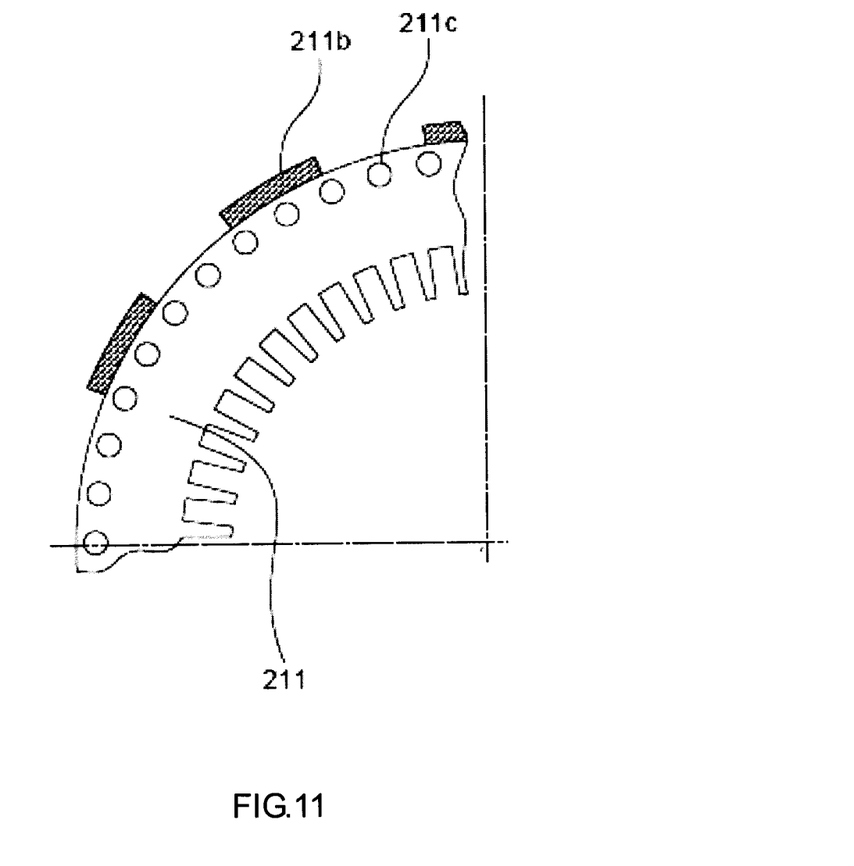
FIG. 11 is a B-B sectional view of FIG. 10.

A construction of an embodiment of such a fully enclosed motor with outer fans will be described with reference to FIG. 10 and FIG. 11. FIG. 10 is a sectional view of a fully enclosed motor with outer fans, and FIG. 11 is a ¼ figure showing the section at a B-B portion of a stator core 211 in FIG. 10. The same numbers are given to the same component names as in FIG. 14, and the description thereof will be omitted.

As shown in FIG. 10, in a conventional fully enclosed motor with outer fans, core holders 211a, 211a are attached to the both sides of the stator core 211. Between the core holders 211a, 211a at the both sides, a plurality of connecting plates 211b are attached to portions of the whole outer circumference of the stator core 211 (Refer to FIG. 11). A plurality of ventilation passages 211c are made at the outer circumference side of the stator core 211. The rotor core 7 and a ventilation fan 214 having vanes 214a and 214b which are attached to the both faces of a fan main plate 214c radially from the axis of rotation are attached to the rotor shaft 6.

A plurality of external air intake ports 202a are made circumferentially at the side face portions of a bearing bracket 202 in which the bearing 4 to support the rotor shaft 6 is provided at the central portion. The bearing bracket 202 is attached to the core holder 211a through a connecting bracket 203. A fixed bracket 204 is attached to the core holder 211a of the other end of the stator core 211, and the bearing 5 is arranged at its central portion through the housing 3 to support the rotor shaft 6.

A ventilation passage 203a which leads to the ventilation passages 211c of the stator core 211 is made in the connecting bracket 203. Cooling wind flows in from a plurality of the external air intake ports 202a which are circumferentially provided at the side face portions of the bearing bracket 202 by the vane 214a of the fan 214, and is opened to outside air from a ventilation passage 204a of the fixed bracket 204 arranged at the other end.

A ventilation passage 203b which leads to an external heat exchanger 20 is also arranged in the connecting bracket 203, and a ventilation flow passage is made in which the air in the motor generated by the vanes 214b of the ventilation fan 214 enters again into the motor through a ventilation passage 204b provided in the fixed bracket 204 arranged at the other end without touching with external air. In the construction of the ventilation route like this, as a minute gap L0 (so-called labyrinth) is made between the inner circumference portion of the connecting bracket 203 corresponding to the outer circumference portion of the ventilation fan 214 and the fan main plate 214c of the ventilation fan 214, the construction that the ventilation air generated by the vanes 214a of the ventilation fan 214 and the ventilation air generated by the vanes 214b of the ventilation fan 214 do not mix with each other is used, that is, the motor is constructed such that the cooling wind inside the motor and the cooling wind outside the motor are used separately. In addition, in the following description of the motor, the inside of the motor and the outside of the motor indicate the inner portion and the outer portion which are partitioned by this minute gap, respectively.

A cooling method for the motor constructed like this is as follows. The cooling wind which has entered from the air intake ports 202a by the vanes 214a of the fan 214 passes through the ventilation passage 203a of the connecting bracket 203, passes through the ventilation passages 211c and is discharged to external air from the ventilation passage 204a of the fixed bracket 204. As a result, the heat generated in the coil 12 is cooled through the stator core 211.

There is cooling wind that the air inside the motor passes through the ventilation passage 203b of the connecting bracket 203, and returns to the inside of the motor from the ventilation passage 204b of the fixed bracket 204 via the heat exchanger 20, and this circulating wind is cooled with a heat exchanging operation between the heat exchanger 20 and the external air which enters from the air intake ports 202a by the fan main plate 214c of the fan 214, and the cooled cooling wind passes through the ventilation passages 7a and the air gap 13 to thereby cool the rotor bars 8 directly or via the rotor core 7. In addition, the air which has entered inside the motor is discharged again from the vanes 214b of the fan 214 to circulate inside the motor.

The circulation wind inside the motor cools not only the rotor bars 8 but the coils 12, the bearings 4, 5 and the grease and so on. Cooling winds flow separately through the respective ventilation passages inside the motor and outside the motor like this, causing the motor to be cooled efficiently, and the stator coils 12 and the rotor bars 8 do not touch external air and are not polluted, the inside of the motor is not polluted, and thereby a fully enclosed type motor in which internal cleaning is not required can be provided (Refer to Patent Document 1, for example).

Figures 12, 13:
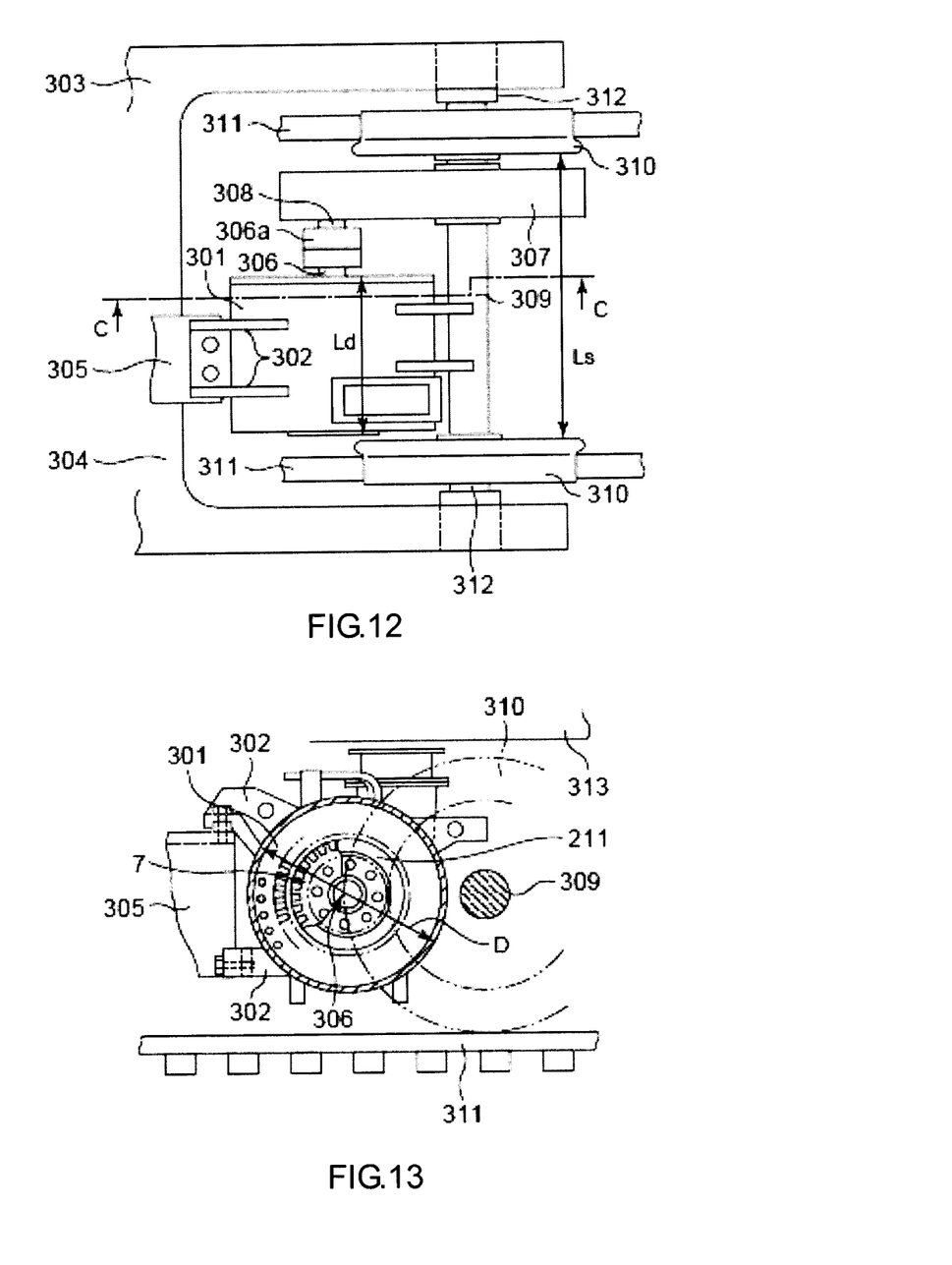
FIG. 12 is a plan view of a bogie under a vehicle floor of a rail vehicle.
FIG. 13 is a C-C sectional view of FIG. 12.

Next, a problem restricted for a rail vehicle will be described. FIG. 12 and FIG. 13 show a general state that a motor for a vehicle is mounted inside a bogie, and FIG. 12 is a plan view seen from the upper face, and FIG. 13 is a side sectional view of a section CC portion of FIG. 12 seen from the side direction.

A motor 301 is mounted on a mounting seat 305 provided at a beam 304 of a bogie 303 through an upper mounting nose 302 and lower mounting feet 302a. A drive shaft 306 of the motor 301 is directly coupled with a gear shaft 308 of a gearwheel device via a coupling 306a. Gears (not shown in the drawings) are mounted to the gear shaft 308 and an axle 309, respectively, and engage with each other so that the rotative force of the motor is transmitted to the axle 309. A case 307 for the gears is filled with lubricant agent.

The rotative force transmitted to the axle 309 causes the wheels 310, 310 mounted on the axle 309 to rotate. As a result, a mechanism that a vehicle body 313 mounted on the bogie 303 moves while rolling on rails 311 is made. The axle 309 is rotatably fitted on the bogie 303 via bearings 312, 312. The motor 301 of FIG. 13 is shown by a sectional view so that the inside portion can be understood.

In the bogie construction like this, Ls is a size of a gap between the wheels 310, 310, and it is necessary to arrange the motor 301 within a range of a size Ld which is obtained by subtracting width sizes of the gear case 307 and the coupling 306A from this size Ls. That means, the motor 301 has a very limited size restriction. The magnitude of the output power of the motor 301 is determined by an outer diameter D of the stator core and a length L of the stator core (also equal to a length of the rotor). The outer diameter D of the stator core is shown in FIG. 10 and FIG. 13.

The length L of the stator core is shown in FIG. 10. As Ld is obtained by adding the other constituent members to the length L of the stator core, the other constituent members except the core are important in constituting the motor.

In a conventional fully enclosed type motor, because the heat exchanger 20 was to be added compared with a usual motor, and the vanes 214B of the heat exchanging fan 214 to flow the wind circulating inside the motor were provided, there was a problem that the construction was complicated and the cost was increased. In addition, there was the restriction for a motor for a vehicle with respect to the size of the motor as described above, it was necessary that the size of the motor in the longitudinal direction did not become large.

DETAILED DESCRIPTION

According to one embodiment, a traction motor includes a stator core, a rotor core, a first bearing, a second bearing, a rotor shaft, a first ventilation passage made at an outer circumference portion of the stator core, a first fan, and a second ventilation passage to introduce external air. And, in the motor, a first minute gap is provided between an end portion of a first fan main plate and an inner circumference portion of the first bracket, cooling wind is discharged to the motor outside via the second ventilation passage, an outer circumference portion of the first fan, a ventilation portion in the first bracket and the first ventilation passage, and the second ventilation passage is made so that the cooling wind entered from the first air intake port flows around the rotor shaft portion between the first ventilation fan and the first bearing.

Hereinafter, embodiments will be described with reference to the drawings.

First Embodiment

Figure 1:
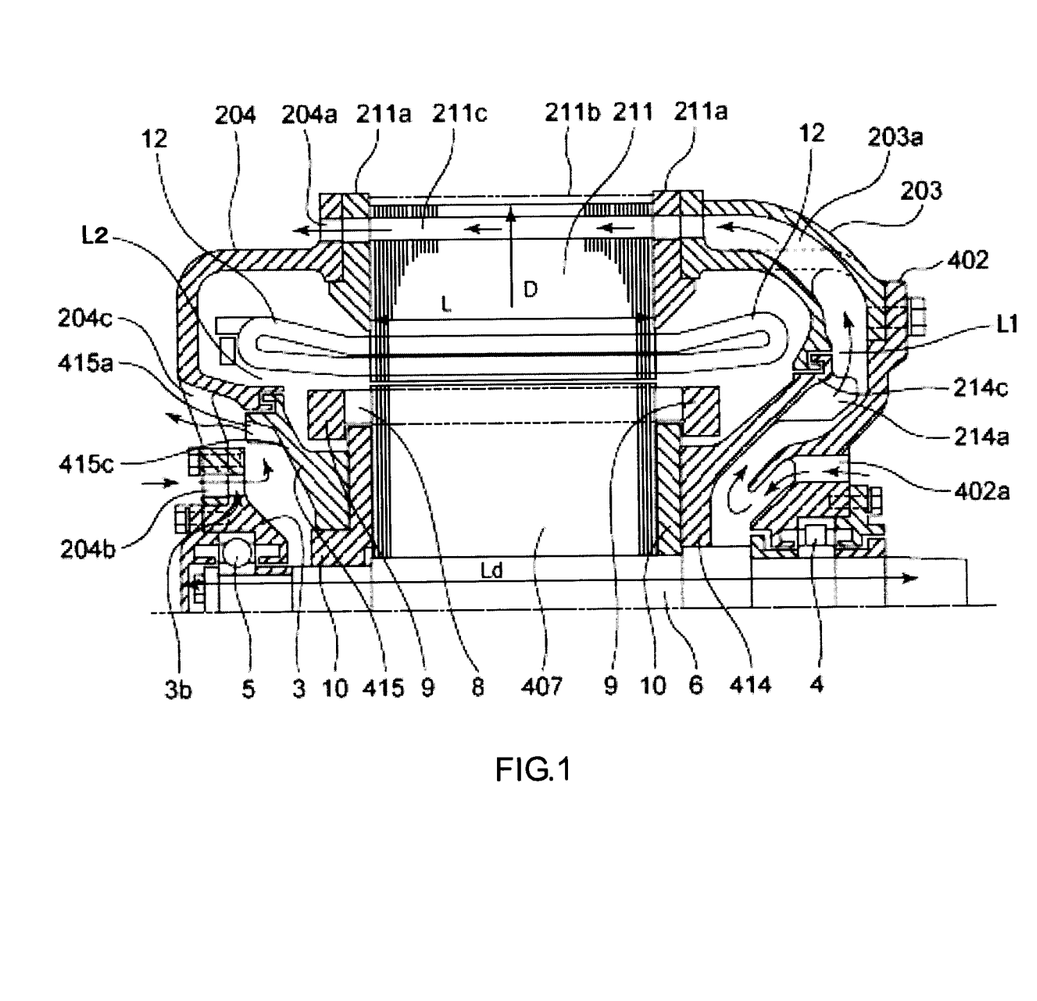
FIG. 1 is sectional view of a traction motor according to a first embodiment.

FIG. 1 is a sectional view of a traction motor for a vehicle according to a first embodiment.

The core holders 211a, 211a are attached to the both sides of the stator core 211. Between the core holders 211a, 211a at the both ends, a plurality of the connecting plates 211b are attached to portions of the whole outer circumference of the stator core 211. A plurality of the ventilation passages 211c are made at the outer circumference side of the stator core 211 by combining a plurality of connecting plates 211b. A rotor core 407 and a ventilation fan 414 are attached to the rotor shaft 6. A plurality of the vanes 214a are attached to one surface of the fan main plate 214c of the ventilation fan 414 in the circumference direction so as to be arranged radially from its axis of rotation with proper intervals. The portion inside the motor of the fan main plate 214C extends to the vicinity of the inner circumferences of the end rings 9 to thereby make a construction that it is attached firmly to the rotor core 407 and the core holder 10.

A plurality of external air intake ports 402a are made circumferentially so that external air run round near the rotor shaft 6 from the outside in a bearing bracket 402 in which the bearing 4 to support the rotor shaft 6 is provided at the central portion. The bearing bracket 402 is attached to the core holder 211a through the outer circumference portion of the connecting bracket 203. In the connecting bracket 203, the ventilation passage 203a which leads to the ventilation passages 211c of the stator core 211 is made to circulate the cooling wind generated by the vanes 214a of the ventilation fan 414. The construction that a minute gap L1 (so-called labyrinth) is formed between the end portion of the inner circumference portion of the connecting bracket 203 corresponding to the outer circumference portion of the ventilation fan 414 and the end portion of the fan main plate 214c of the ventilation fan 414 is used. As a result, the construction that the cooling wind at the vanes 214a side of the ventilation fan 414 does not enter inside the motor is used. In addition, the fixed bracket 204 is attached to the core holder 211a of the other end of the stator core 211. The housing 3 to support the rotor shaft 6 with the bearing 5 is attached to the central portion of the fixed bracket 204.

The construction is used that the ventilation passage 204a corresponding to the ventilation passages 211c is provided in the fixed bracket 204 to open to external air, and the cooling wind which has passed through the ventilation passages 211c is discharged to the outside of the motor from the ventilation passages 204a.

A ventilation fan 415 is provided at the position opposite to the ventilation fan 414 in the axis direction of the motor, that is, at the side opposite to the drive side. The construction is used that vanes 415a are provided at one side of a fan main plate 415C of the ventilation fan 415, and the portion inside the motor of the fan main plate 415C is attached firmly to the rotor core 407 and the core holder 10. The wind discharged by the vanes 415a passes through the ventilation passage 204c provided in the fixed bracket 204 portion and is discharged outside the motor. The wind generated by the vanes 415a introduces external air from an air intake port 204b and an air intake port 3b which are respectively provided in the fixed bracket 204 and the housing 3. As a minute gap L2 (so-called labyrinth) is also formed between the end portion of the inner circumference portion of the fixed bracket 204 corresponding to the outer circumference portion of the ventilation fan 415 and the end portion of the fan main plate 415C of the ventilation fan 415, the cooling wind at the vanes 415a side of the ventilation fan 415 does not enter inside the motor.

In the motor constructed like this, external air enters from the air intake ports 402a, passes through the vicinity of the rotor shaft 6, and flows from the outer circumference portion of the ventilation fan 414 to the ventilation passages 203a, 211c by the action of the vanes 214a of the ventilation fan 414, as shown in arrows in FIG. 1, and cools the stator core 211 to thereby absorb the heat generated in the coils 12. Here, the ventilation passage formed in the vicinity of the rotor shaft 6 is defined as a first ventilation passage, and the ventilation passage formed in the ventilation passages 211c is defined as a second ventilation passage.

At the same time, as the heat generated in the rotor bars 8 and the end rings 9 is conducted to the fan main plate 214C of the ventilation fan 414 extending to the vicinity of the inner circumference sides of the end rings 9 through the rotor core 407 and the rotor core holder 10, and is discharged into the cooling wind generated by the vanes 214a, the rotor can also be cooled.

The action of the ventilation fan 415 is the same as that of the ventilation fan 414, and though the stator core 211 is not cooled, the cooling wind flows as arrows in FIG. 1, and thereby enabling the rotor (the rotor bars 8, the end rings 9) to be cooled. In addition, the wind generated by the vanes 214a, 415a, the bearings 4, 5 and their lubricant agents can be cooled, respectively. The motor constructed like this, as the inside the motor and external air are separated by the minute gaps L1, L2, has an effect that the pollution is not generated inside the motor and heat generation of the motor can be suppressed.

Further, as the vanes 214b can be eliminated, the size Ld in the longitudinal direction in FIG. 13 which constitutes the restriction condition of a rail vehicle become shorter. Accordingly, as the motor is made in a fully enclosed type and can satisfy the cooling effect, and the size L of the core can be made large, an ideal motor with high performance can be provided.

In the case of the construction without providing the core holders 10, the fan 414 and the rotor core 407, and the fan 415 and the rotor core are respectively attached firmly to each other. The construction is used that the cooling wind flowing from the air intake ports 402a passes through the vicinity of the rotor shaft 6 between the ventilation fan 414 and the bearing 4, but a construction that the cooling wind directly reaches the rotor shaft 6 may be used.

Second Embodiment

Figure 2:
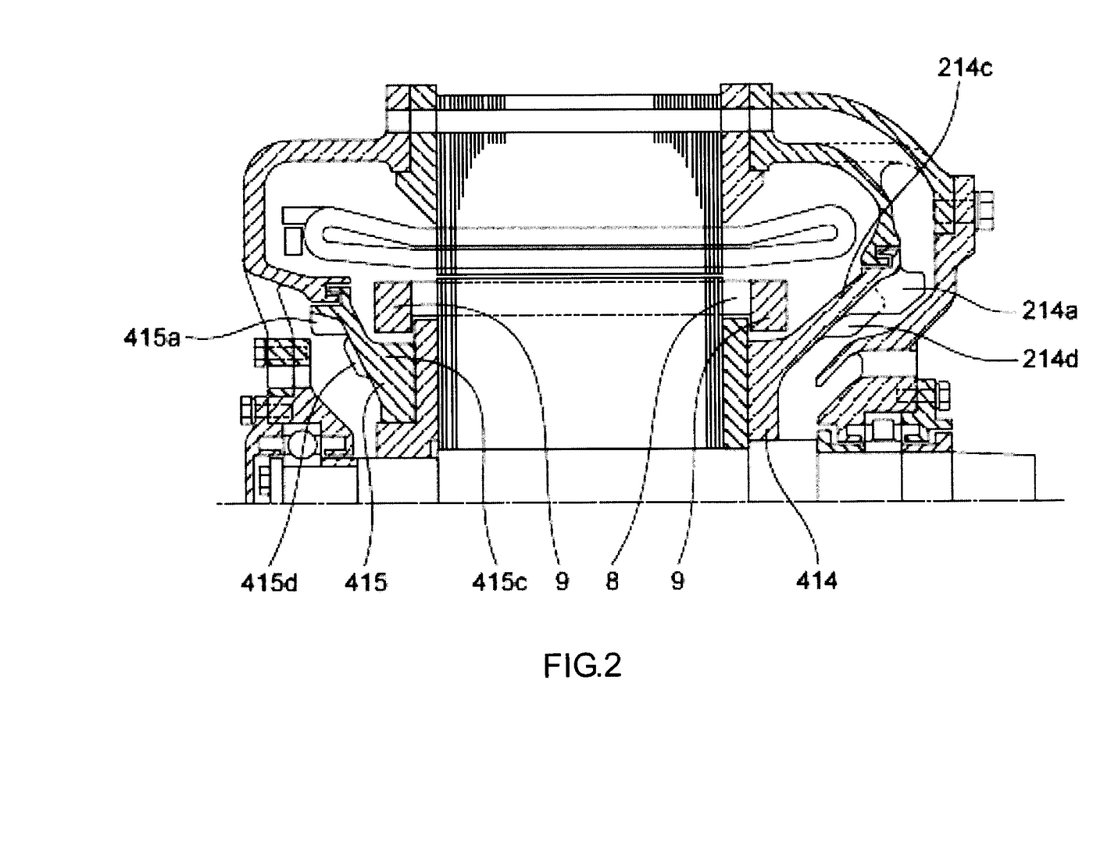
FIG. 2 is sectional view of a traction motor according to a second embodiment.

FIG. 2 is a sectional view of a traction motor for a vehicle according to a second embodiment. Points in which this second embodiment is different from the first embodiment shown in FIG. 1 are a point that radiator plates 214d are provided at the vanes 214a side of the fan main plate 214c of the ventilation fan 414 and a point that radiator plates 415d are provided at the vanes 415a side of the fan main plate 415c of the ventilation fan 415. As a result of providing the radiator plates 214d, the heat of the rotor (the rotor bars 8, the end rings 9) can be more discharged outside. A plurality of the radiator plates 214d may be provided between the adjacent vanes 214a, respectively, or there may be portions between the adjacent vanes 214a where the radiator plate 214 is provided and the other portions where the radiator plate 214 is not provided. That is, the number, shape and position of the radiator plates 214d are not limited. The radiator plates 415d are also provided at the ventilation fan 415 outside the motor, this effect is fundamentally the same as that of the radiator plates 214d. The number, shape and position of the radiator plates 415d are also not limited, and the radiator plates 415d may be attached as needed.

Third Embodiment

Figure 3:
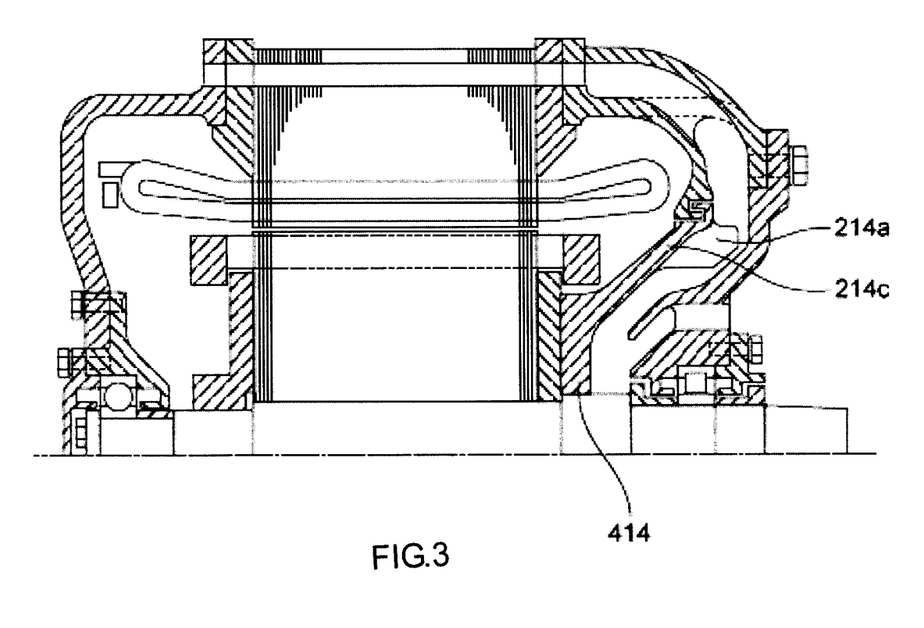
FIG. 3 is sectional view of a traction motor according to a third embodiment.

FIG. 3 is a sectional view of a traction motor for a vehicle according to a third embodiment. A point in which this third embodiment is different from the first embodiment shown in FIG. 1 is a point that the ventilation fan 415 at the side opposite to the drive shaft side is omitted. In case that only the ventilation fan 414 at the drive shaft side is sufficient for cooling, there is no need to provide the ventilation fan at the side opposite to the drive shaft side. As shown in the second embodiment, the radiator plates 214d may be attached to the fan main plate 214C.

Fourth Embodiment

Figure 4:
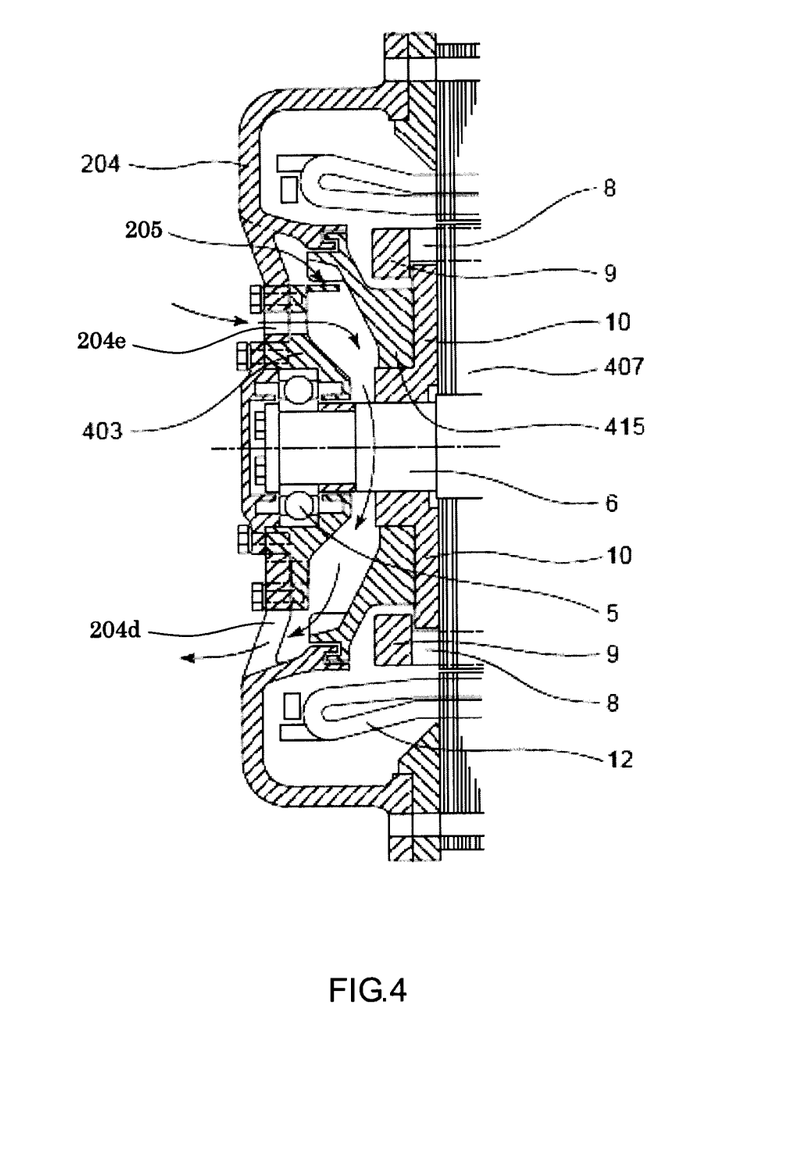
FIG. 4 is sectional view of a traction motor according to a fourth embodiment.

FIG. 4 is a sectional view of a traction motor for a vehicle at the side opposite to the drive side according to a fourth embodiment. Points in which this fourth embodiment is different from the first embodiment shown in FIG. 1 is a point that in place of the ventilation passage 204c, and the air intake ports 204b, 3b, a ventilation passage 204d is provided at the lower portion of the housing 403 and an air intake port 204e is provided at the upper portion thereof, and a point that a partition plate 205 is provided inside a portion where the fixed bracket 204 above the air intake port 204e overlaps with the housing 403 at the lower portion.

By the action of this partition plate 205, as cooling wind flows as arrows in FIG. 4, the bearing 5 can be cooled through the housing 403, and thereby the performance of cooling the bearing 5 can be improved at a large extent. In addition, the root portion of the ventilation fan 415 and the rotor shaft 6 can be cooled, and thereby this embodiment is effective for cooling the rotor (the rotor bars 8, the end rings 9).

<Other Embodiments>

Figure 5:
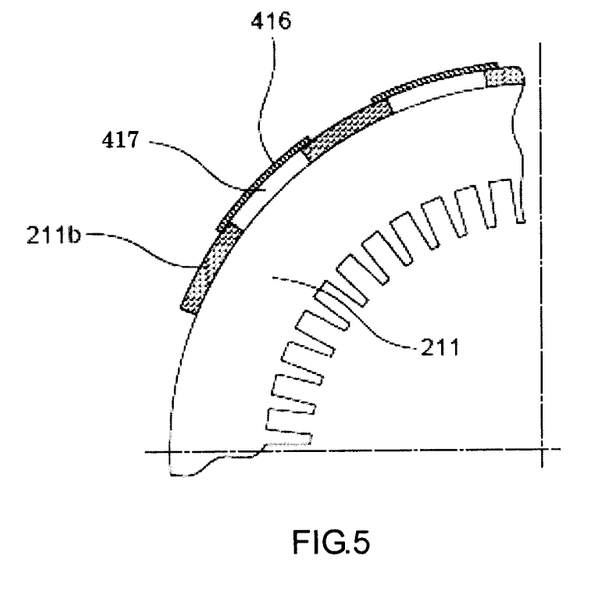
FIG. 5 is a sectional view showing a modification of a ventilation passage of a traction motor.
Figure 6:
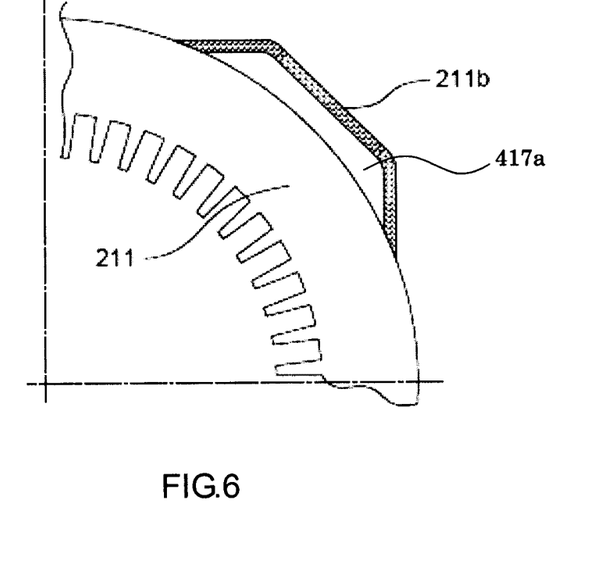
FIG. 6 is a sectional view showing a modification of a ventilation passage of a traction motor.

The ventilation passage 211C of FIG. 1 is a hole, but the shape of the hole is not questioned. In addition, fins and so on may be made in the hole so as to improve the cooling performance. In addition, as shown in FIG. 5, an air hole 417 composed of the stator core 211, the connecting plate 211b and a cover 416 may be provided and the ventilation passage 211c may be replaced with this portion. In addition, as shown in FIG. 6, an air hole may be made with the connecting plate 211b to use as a ventilation passage 417a.

In FIG. 1 and other modifications, the frameless structures to increase more output power have been described, but the motor may be made with a structure having a frame. In addition, a construction may be used in which the drive side and the side opposite to the drive side are interchanged.

Figure 7:
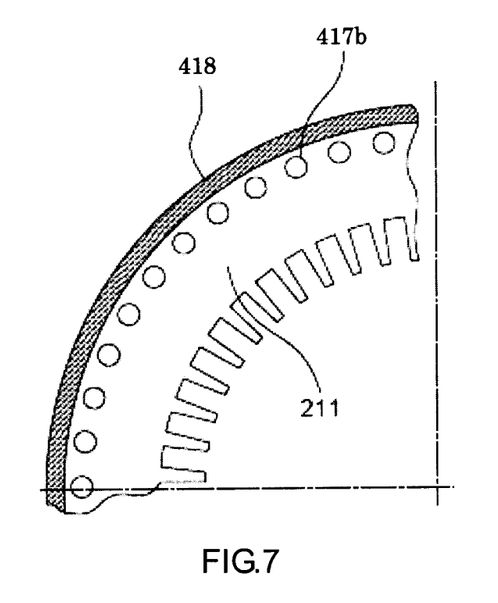
FIG. 7 is a sectional view showing a modification of a ventilation passage of a traction motor.
Figure 8:
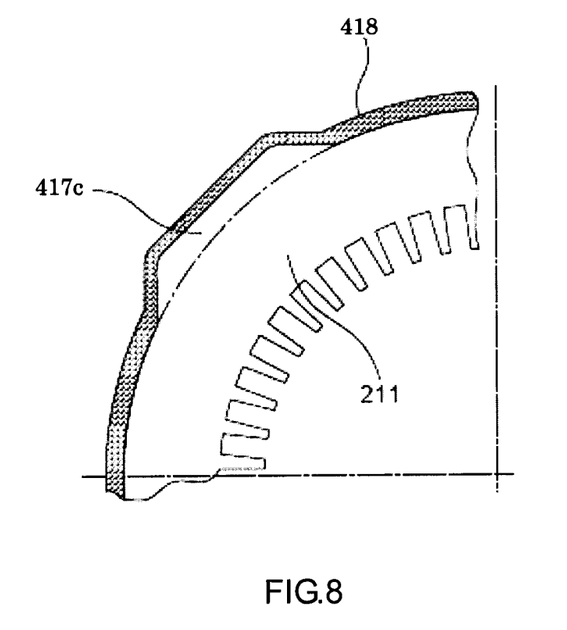
FIG. 8 is a sectional view showing a modification of a ventilation passage of a traction motor.
Figure 9:
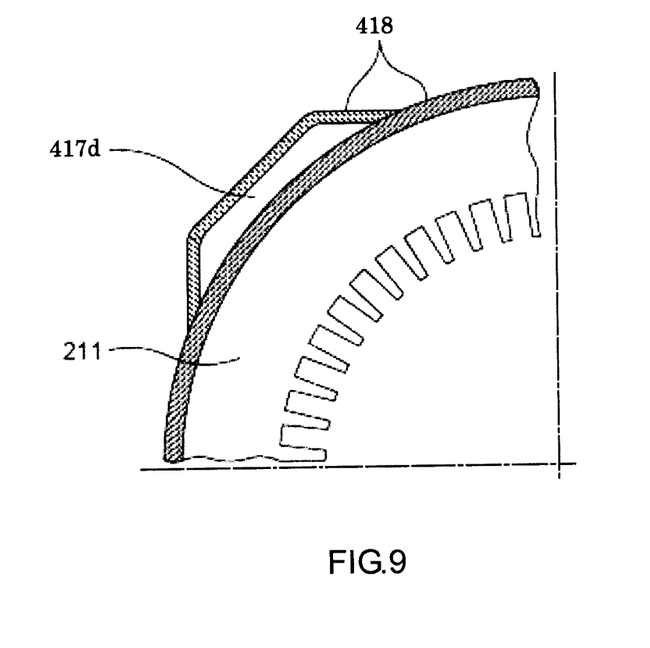
FIG. 9 is a sectional view showing a modification of a ventilation passage of a traction motor.

FIG. 7 to FIG. 9 each shows an example of a structure having a frame 418. In FIG. 7, ventilation passages 417b are provided in the stator core 211. As shown in FIG. 8, a ventilation passage 417c may be made between the stator core 211 and the frame 418. As shown in FIG. 9, a ventilation passage 417d may be provided outside the stator core 211. The ventilation passages 211c and the compatible passages thereof are not provided at the whole outer circumference portion of the motor, but may be made partially or at the periodic positions. The ventilation passages may be made by combining various ones with respect to the size, shape and so on. In addition, the motor is not composed of only those described in the present specification, but may be composed of by combining each of the embodiments. The above description have been made assuming that the ventilation passages are not provided in the rotor, but the ventilation passages may be made in the rotor core and the core holders. Or it may be one which does not function as the ventilation passage.

As described above, according to the embodiment, because stator coils, rotor bars and end rings that are heat generators can be cooled effectively, in addition, rise in temperature of bearings and grease can be suppressed, a structure which has a merit of fully enclosed type that internal cleaning thereof is not required and in which cleaning of a filter is not needed and save labor saving in maintenance is possible at a large extent can be realized, and further a motor with higher performance than a conventional one can be provided, an ideal fully enclosed type motor with outer fans can be provided.

According to the embodiment, it becomes possible to provide a fully enclosed type traction motor for a vehicle which can secure the cooling performance required for the motor and can make the size of the motor in the longitudinal direction small.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A traction motor comprising:
   a rotor shaft;
   a stator core placed between a first bracket and a second bracket;
   a rotor core attached to the rotor shaft and placed on an inside of the stator core;
   a first bearing, placed in a bearing bracket which is attached to the first bracket, for supporting the rotor shaft so as to enable the rotor shaft to rotate;
   a second bearing, placed in a housing which is attached to the second bracket, for supporting the rotor shaft so as to enable the rotor shaft to rotate;
   a first fan attached to the rotor shaft between the rotor core and the first bearing, and attached to the rotor core or a rotor holder, wherein a plurality of first radial vanes are formed only on a surface of the first fan facing to the bearing bracket;
   a second fan, attached to the rotor shaft between the rotor core and the second bearing, and attached to a rotor holder;
   a first air passage formed in a perimeter part of the stator core;

a second air passage, connected to the first air passage and formed between the first bracket and the bearing bracket, for flowing air drawn from a first air intake formed in the bearing bracket to the first air passage, wherein the first air intake is located nearer the rotor shaft compared with the first radial vanes so that the drawn air flows near the rotor shaft; and a third air passage, independent from the first and second air passages and formed between the second bracket, the housing, and the second fan, for flowing air drawn from a second intake formed in the second bracket to an outtake formed in the second bracket.

2. The traction motor according to claim 1, wherein the rotor shaft includes an exposed part between the first fan and the first bearing, exposed to the second air passage.

3. The traction motor according to claim 1, further comprising cooling fins formed only on the surface of the first fan facing to the bearing bracket.

4. The traction motor according to claim 1, wherein the first air passage is formed inside of the stator core.

5. The traction motor according to claim 1, further comprising:

a frame for covering the stator core, wherein the first air passage is formed between the frame and the stator core.

6. The traction motor according to clam 2, wherein the first air intake includes an oblique air passage portion for leading the drawn air toward the exposed part of the rotor shaft.

7. The traction motor according to claim 1, further comprising:

a partition plate attached to the second bracket; and a second radial vane attached on a surface of the second fan facing to the housing, wherein the second intake is placed on one side of the rotor shaft and the outtake is placed on another side of the rotor shaft, and the partition plate is placed on an inner side of the second fan and an outer side of the second intake.

8. The traction motor according to claim 1, further comprising:

a plurality of connecting plates attached to an outer circumference of the stator core so that at least one part of the outer circumference of the stator core is exposed; and a plurality of covers attached to two adjacent connecting plates so as to form the first air passage between the exposed outer circumference, the two adjacent connecting plates, and the cover.

9. The traction motor according to claim 1, further comprising:

a plurality of connecting plates attached to an outer circumference of the stator core so that at least one part of the outer circumference of the stator core is exposed, wherein the first air passage is formed between the plurality of connecting plates and the outer circumference of the stator core.

10. The traction motor according to claim 1, further comprising:

a frame for covering the stator core, wherein the first air passage is formed in the frame.

* * * * *